United States Patent Office 2,915,546
Patented Dec. 1, 1959

2,915,546

PROCESS FOR THE MANUFACTURE OF THIOPHOSPHORIC ACID ESTERS

Walter Lorenz and Rudolf Muhlmann, Wuppertal-Elberfeld, and Gerhard Schrader, Wuppertal-Cronenberg, Germany, assignors to Farbenfabriken Bayer Aktiengesellschaft, Leverkusen, Germany, a corporation of Germany No Drawing. Application May 10, 1956
Serial No. 583,953

Claims priority, application Germany May 13, 1955

4 Claims. (Cl. 260—461)

This invention relates to a new and economic process for the manufacture of thiophosphoric acid esters containing sulphoxyl or sulphonyl groups.

Various processes are known for the manufacture of esters of phosphoric acid, thiophosphoric or thiono-thiolphosphoric acid, which contain in an alkyl radical the sulphone group. The sulphoxy compounds corresponding to the said sulphones were not hitherto known.

In accordance with the invention it has been found that thiophosphoric acid esters can be obtained in a simple and convenient process and in a good yield by reacting sulphoxides or the corresponding sulphones of the formula:

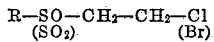

with the alkaline metal or ammonium salts of dialkyl-thiol- or dialkyl-thiono-thiol phosphoric acids.

The afore-defined sulphoxides and sulphones respectively are obtained according to the invention by oxidizing the easily accessible β-chloro- or β-bromalkyl sulphides to the corresponding sulphoxides with hydrogen peroxide and to the corresponding sulphones with potassium permanganate in a neutral solution.

The reaction of the said sulphoxides or sulphones with the alkali metal or ammonium salts of dialkyl-thiol- or dialkyl-thiono-thiol phosphoric acids is carried out at temperatures between 0 and 150° C., preferably between 10–80° C. It is of advantage to conduct the reaction in an organic solvent, e.g. a lower alkohol, ketone, hydrocarbon or halogenated hydrocarbon.

The reaction can be illustrated by the conversion of O,O-diethyl ammonium thiophosphate with β-bromoethyl-methyl-sulphone (or sulphoxide)

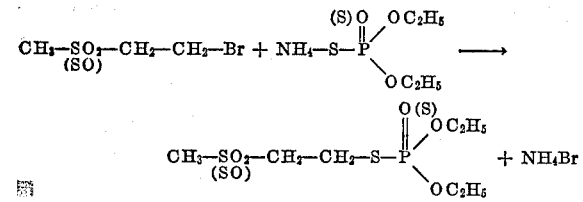

Due to the surprising fact that the halogens in the β-chloro- or β bromethylalkyl sulphoxides and sulphones are very loosely linked to the carbon, it is possible to carry out the process of the invention under the afore-said mild conditions which render the process highly economical.

Example 1

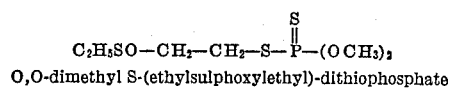

O,O-dimethyl S-(ethylsulphoxyethyl)-dithiophosphate 35 grams (0.2 mol) of the ammonium salt of dimethyl dithiophosphoric acid (M.P. 147° C.) are suspended in 75 millilitres of methyl ethyl ketone, and treated with 39.5 grams (0.215 mol) of β-ethylsulphoxylethyl bromide. After a short time the ammonium salt of dimethyl dithiophosphoric acid dissolves and ammonium bromide precipitates at the same time in the form of a heavy crystalline powder without a noticeable rise in temperature. The mixture is stirred overnight, the ammonium bromide is filtered off by suction, and the solvent is distilled off. The remaining oil is taken up in benzene and repeatedly washed with water. After drying over sodium sulphate and distilling off the solvent, 32 grams of O,O-dimethyl-S-(ethylsulphoxyl)-thionophosphate are obtained as an amber yellow oil, sparingly soluble in water. The yield is 61 percent of the theoretical.

Example 2

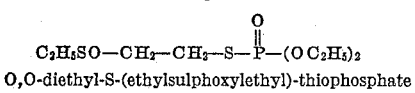

O,O-diethyl-S-(ethylsulphoxyethyl)-thiophosphate

A solution of 56 grams (0.3 mol) of the ammonium salt of diethyl thiophosphoric acid and 58 grams (0.315 mol) of β-ethylsulphoxylethyl bromide in 100 millilitres of methyl ethyl ketone is heated to 70 to 75° C. for 30 minutes. After cooling, the solution is filtered by suction to remove the precipitated ammonium bromide, and the solvent is distilled off under vacuum. The remaining oil is dissolved in about 250 millilitres of water. The sulphoxyl ester is salted out by adding a saturated potash solution. The ester is taken up in chlorobenzene, separated from the aqueous layer and dried over sodium sulphate. By a vacuum distillation at 0.01 mm. Hg, 75 grams or 91.4 percent of the sulphoxyl ester are obtained as an amber yellow, water-soluble oil, distilling over at 108° C.

Example 3

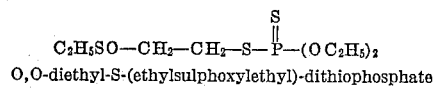

O,O-diethyl-S-(ethylsulphoxyethyl)-dithiophosphate 56 grams of β-ethylsulphoxylethyl bromide are added dropwise with stirring at 50 to 60° C. to 65 grams of the ammonium salt of diethyl dithiophosphoric acid. After heating for a half hour to 60° C. and cooling, water is added and the oil separated out is taken up in methylene chloride. The methylene chloride layer is washed with water. After drying over sodium sulphate and removing the solvent, 65 grams of the sulphoxyl ester are obtained as a pale yellow, practically water-insoluble oil, distilling at 108° C./0.01 mm. Hg without substantial decomposition. The yield is 78.5 percent of the theoretical.

Example 4

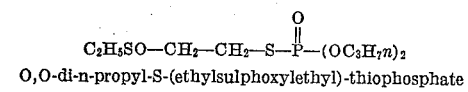

O,O-di-n-propyl-S-(ethylsulphoxyethyl)-thiophosphate 43 grams (0.2 mol) of the ammonium salt of di-n-propyl thiophosphoric acid and 39.5 grams of β-ethylsulphoxylethyl bromide are dissolved in 75 millilitres of methyl ethyl ketone. Ammonium bromide begins to separate out after about 30 minutes without a substantial rise in temperature. After heating to 50 to 60° C. for 1 hour, the solution is filtered by suction from the ammonium bromide and after working up as described in the preceding examples, 50 grams of the sulphoxyl ester are obtained as a yellow water-soluble oil.

Yield: 82.7 percent.

Example 5

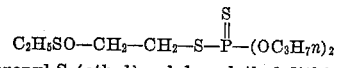

O,O-di-n-propyl-S-(ethyl)-sulphoxylethyl-dithiophosphate 46 grams (0.2 mol) of the ammonium salt of di-n-propyl thiophosphoric acid (M.P. 151–152° C.) and 39.5 grams (0.215 mol) of β-ethyl-sulphoxylethyl bromide are stirred into 75 millilitres of acetone at room temperature for 4 hours. Ammonium bromide separates out on slight warming. After working up as described in the preceding examples, 51 grams or 80.5 percent of the sulphoxyl ester are obtained as a yellowish brown oil.

*Example 6*

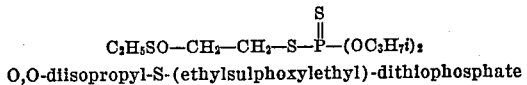

O,O-diisopropyl-S-(ethylsulphoxylethyl)-dithiophosphate 46 grams (0.2 mol) of the ammonium salt of diisopropyl dithiophosphoric acid (M.P. 166° C.), and 39.5 grams (0.215 mol) of β-ethylsulphoxyl ethyl bromide are suspended in 75 millilitres of methyl ethyl ketone. Ammonium bromide is slowly separated out by slow warming to about 35° C. The mixture is stirred overnight at room temperature to complete the reaction, and the solution is then filtered off by suction from the ammonium bromide. After the solvent has been distilled off, the remaining oil is taken up in benzene, washed with water and dried over sodium sulphate. After the customary working up, 50 grams or 78.5 percent of the theoretical yield of the sulphoxyl ester are obtained as a pale yellow water-soluble oil.

*Example 7*

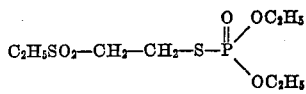

O,O-diethyl-S-ethylsulphone-ethyl ester thiophosphate 19 grams of the ammonium salt of monothio-diethyl phosphoric acid are mixed with 20 grams of β-bromethyl-ethylsulphone (B.P. 59° C./0.01 mm. Hg) and heated with stirring to 85° C. for 40 minutes. After cooling, the reaction mixture is treated with 200 millilitres of water and neutralised with sodium carbonate. The solution is extracted with methylene chloride, dried with sodium sulphate, and after evaporation of the solvent, fractionated under vacuum. 18 grams of the new sulphone are obtained, boiling at 115° C./0.01 mm. Hg.

*Example 8*

32 grams of β-chloroethyl-ethylsulphone (B.P. 112° C./2 mm. Hg) are stirred together with 37 grams of the ammonium salt of monothio-diethyl phosphoric acid for one hour at 100° C. as described in Example 7. After the customary working up, 10 grams of the new sulphone are obtained, B.P. 115° C./0.01 mm. Hg.

*Example 9*

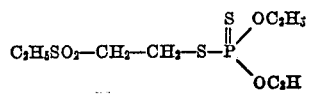

20 grams of the ammonium salt of O,O-diethyl dithiophosphoric acid are stirred together with 20 grams of β-bromethyl-ethylsulphone at 80° C. for 10 minutes. After the customary working up, 26.5 grams of the new sulphone are obtained as a colourless water-insoluble oil, B.P. 109° C./0.01 mm. Hg.

*Example 10*

20 grams of the ammonium salt of O,O-diethyl dithiophosphoric acid are heated with 16 grams of β-chloroethyl-ethylsulphone to 85° C. for 2 hours. After the customary working up, 10 grams of the new ester are obtained, B.P. 110° C./0.01 mm. Hg.

We claim:

1. A process for the manufacture of thiophosphoric acid esters, which comprises reacting a member selected from the group consisting of β-chloro-ethyl-lower alkyl sulphoxides, β-chloroethyl-lower alkyl sulphones, β-bromoethyl-lower alkyl sulphoxides and β-bromoethyl-lower alkyl sulphones with a member selected from the group consisting of alkali metal and ammonium salts of di-lower alkylthiol and di-lower alkylthionothiol phosphoric acids.

2. A process for the manufacture of thiophosphoric acid esters, which comprises reacting a member selected from the group consisting of β-chloro-ethyl-lower alkyl sulphoxides, β-chloroethyl-lower alkyl sulphones, β-bromoethyl-lower alkyl sulphoxides and β-bromoethyl-lower alkyl sulphones with a member selected from the group consisting of alkali metal and ammonium salts of di-lower alkylthiol and di-lower alkylthionothiol phosphoric acids at a temperature between 0 and 150° C.

3. A process for the manufacture of thiophosphoric acid esters, which comprises reacting a member selected from the group consisting of β-chloro-ethyl-lower alkyl sulphoxides, β-chloroethyl-lower alkyl sulphones, β-bromoethyl lower alkyl sulphones and β-bromoethyl-lower alkyl sulphones with a member selected from the group consisting of alkali metal and ammonium salts of di-lower alkylthiol and di-lower alkylthionothiol phosphoric acids at a temperature between 10 and 80° C.

4. A process as claimed in claim 1 wherein the reaction is carried out in the presence of an organic solvent.

References Cited in the file of this patent

UNITED STATES PATENTS

| | | |
|---|---|---|
| 2,494,283 | Cassaday et al. | Jan. 10, 1950 |
| 2,597,534 | Schrader | May 20, 1952 |
| 2,736,726 | Gaetzi et al. | Feb. 28, 1956 |
| 2,759,010 | Lorenz et al. | Aug. 14, 1956 |
| 2,803,580 | Metivier | Aug. 20, 1957 |

UNITED STATES PATENT OFFICE

Certificate of Correction

Patent No. 2,915,546                                                     December 1, 1959

Walter Lorenz et al.

It is hereby certified that error appears in the printed specification of the above numbered patent requiring correction and that the said Letters Patent should read as corrected below.

Column 3, lines 52 to 55, Example 9, the formula should appear as shown below instead of as in the patent:

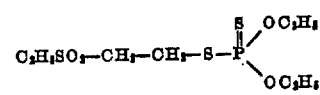

Signed and sealed this 21st day of June 1960.

[SEAL]

Attest:
KARL H. AXLINE,
Attesting Officer.

ROBERT C. WATSON,
Commissioner of Patents.